United States Patent
Mattheijssen et al.

(10) Patent No.: US 12,284,014 B2
(45) Date of Patent: Apr. 22, 2025

(54) BEAMFORMER AND METHOD OF OPERATION OF A BEAMFORMER FOR MIMO ANTENNA SYSTEM

(71) Applicant: NXP B.V., Eindhoven (NL)

(72) Inventors: Paul Mattheijssen, Boxtel (NL); Mustafa Acar, Eindhoven (NL); Lucas Maria Florentinus De Maaijer, Venlo (NL)

(73) Assignee: NXP B.V., Eindhoven (NL)

( * ) Notice: Subject to any disclaimer, the term of this patent is extended or adjusted under 35 U.S.C. 154(b) by 61 days.

(21) Appl. No.: 18/306,391

(22) Filed: Apr. 25, 2023

(65) Prior Publication Data

US 2023/0387985 A1    Nov. 30, 2023

(30) Foreign Application Priority Data

May 30, 2022    (EP) ..................................... 22176157

(51) Int. Cl.
   *H04B 7/06*    (2006.01)
   *H04B 7/0426*    (2017.01)

(52) U.S. Cl.
   CPC ......... *H04B 7/0617* (2013.01); *H04B 7/0426* (2013.01)

(58) Field of Classification Search
   CPC ............................ H04B 7/0617; H04B 7/0426
   USPC .......................................................... 375/267
   See application file for complete search history.

(56) References Cited

U.S. PATENT DOCUMENTS

| | | | |
|---|---|---|---|
| 9,225,290 B2 * | 12/2015 | Liou | ................. H03F 3/265 |
| 9,813,085 B1 | 11/2017 | Butler et al. | |
| 10,270,510 B1 | 4/2019 | Wang et al. | |
| 10,812,166 B2 | 10/2020 | Kim et al. | |
| 10,979,090 B2 | 4/2021 | Rafique | |
| 11,251,822 B1 * | 2/2022 | Gundel | ..................... H04B 1/28 |
| 2010/0166110 A1 * | 7/2010 | Neumann | ............. H04L 27/368 |
| | | | 375/296 |
| 2010/0248651 A1 | 9/2010 | Dent | |
| 2012/0002752 A1 | 1/2012 | Coan et al. | |

(Continued)

FOREIGN PATENT DOCUMENTS

| | | |
|---|---|---|
| WO | 2016/126368 A1 | 8/2016 |
| WO | 2020/138830 A1 | 7/2020 |
| WO | 2020/263852 A1 | 12/2020 |

OTHER PUBLICATIONS

S.Y. Kim et al: "A 76-84 GHz 16-Element Phased Array Receiver with a Chip-Level Built-In-Self-Test System"; 2012 EEE Radio Frequency Integrated Circuits Symposium; Jun. 2012; 4 pages.

(Continued)

*Primary Examiner* — Kevin M Burd

(57) ABSTRACT

A beamformer device for a multiple-input, multiple-output (MIMO) antenna system and method of operating a beamformer device is described. the beamformer device includes a number of beamformer channels. Each beamformer channel includes a RF terminal, an antenna connection terminal; and a power detector having a power detector output, The beamformer device includes a digital control interface comprising a serial data input and a serial data output; a control input coupled to the serial data input; and a beamformer monitor output configured to be selectively coupled to either the serial data output or the power detector output of one of the beamformer channels.

18 Claims, 5 Drawing Sheets

(56) References Cited

U.S. PATENT DOCUMENTS

| | | |
|---|---|---|
| 2017/0279470 A1 | 9/2017 | Lee et al. |
| 2018/0069309 A1 | 3/2018 | Friedman et al. |
| 2020/0044362 A1 | 2/2020 | Song et al. |
| 2020/0067466 A1 | 2/2020 | Kushnir |
| 2020/0411981 A1 | 12/2020 | Kimball |
| 2021/0226653 A1 | 7/2021 | Rafique |
| 2021/0377748 A1* | 12/2021 | Baisch .................. H01Q 1/42 |
| 2021/0399417 A1 | 12/2021 | Lane et al. |
| 2022/0128504 A1 | 4/2022 | Gopalakrishnan et al. |
| 2022/0166389 A1 | 5/2022 | Hamid |
| 2023/0074376 A1 | 3/2023 | Valdes Garcia et al. |
| 2023/0170945 A1 | 6/2023 | De Maaijer et al. |
| 2023/0261374 A1 | 8/2023 | De Maaijer et al. |
| 2024/0055765 A1* | 2/2024 | Sakr .................. H01Q 21/065 |

OTHER PUBLICATIONS

Faruk, M., "Robust Single Polarization Coherent Transceiver Using DGD Pre-distortion for Optical Access Networks" Asia Communications and Photonics Conference (ACP), OSA2016, Nov. 2, 2016; 3 pages.

Brihuega, Alberto, "Piecewise Digital Predistortion for mmWave Active Antenna Arrays: Algorithms and Measurements", IEEE Transactions on Microwave Theory and Techniques, vol. 68, No. 9, Sep. 2020; pp. 4000-4017.

Ying Liu et al, "Digital Predistortion Utilizing Over-the-Air Feedback for Phased Arrays", IEEE Access, Digital Object Identifier 10.1109/ACCESS.2021.3063364, Mar. 2, 2021; vol. 9, 2021. pp. 37064-37074.

U.S. Appl. No. 18/051,941, filed Nov. 2, 2022; 42 pages.

U.S. Appl. No. 18/051,941 Notice of Allowance dated Oct. 9, 2024, 9 pages.

* cited by examiner

400

BEAMFORMER AND METHOD OF OPERATION OF A BEAMFORMER FOR MIMO ANTENNA SYSTEM

CROSS-REFERENCE TO RELATED APPLICATIONS

This application claims the priority under 35 U.S.C. § 119 to European patent application no. 22176157.0, filed on 30 May 2022, the contents of which are incorporated by reference herein.

FIELD

This disclosure relates to a beamformer device for a multiple-input multiple-output (MIMO) antenna system and a method of operation of a beamformer device for a MIMO antenna system.

BACKGROUND

Mobile communications cellular networks such as networks supporting 4G or 5G mobile communications standards may use base transceiver stations (BTS) or base stations including antenna systems which support MIMO communications using beamforming techniques to improve the network capacity and coverage.

These antenna systems include an array of antennas, typically implemented as patch antennas arranged in a regular rectangular grid. The pitch or spacing of the patch antennas is determined by the wavelength of the communications frequency used in transmission or reception. The patch antennas may be dual-polarization antennas which have orthogonal polarization to improve antenna diversity and allow the doubling of antenna elements for a given area.

In operation, beamforming and/or beam-steering is used both in transmit mode to focus the direction of the transmitted RF signal towards another BTS or a user equipment receiver (UE) for example a mobile phone and in receive mode to improve the sensitivity of a signal transmitted from a user equipment transmitter.

Beamforming requires multiple antennas to be operated in a transmit (TX) or receive (RX) mode. In transmit mode the phase and amplitude of the signal is adjusted for each of the relevant antenna to form the desired beam direction. In receive mode, the received signals from multiple antenna patches are combined using signal processing techniques to selectively receive signals from a desired beam direction and suppress unwanted signals.

The performance of a MIMO antenna may be improved by linearization of the antenna system. One method of linearization requires a replica of the transmit (TX) signal to be demodulated and compared to the original source signal in order to determine so-called predistortion coefficients. These predistortion coefficients are used to reshape (pre-distort) the source signal such that after the analog post processing the overall signal is linearized. The impact of linearization may be either better signal quality (measured in for example Error Vector Magnitude or another signal quality indicator) or lower power dissipation (by operating the system closer to its compression point)

SUMMARY

Aspects of the disclosure are defined in the accompanying claims. In a first aspect, there is provided a beamformer device for a multiple-input, multiple-output (MIMO) antenna system, the beamformer device comprising: a plurality of beamformer channels, each beamformer channel comprising a RF terminal, an antenna connection terminal; and a power detector having a power detector output and; a digital control interface comprising a serial data input and a serial data output; a control input coupled to the serial data input; and a beamformer monitor output configured to be selectively coupled to either the serial data output or the power detector output of one of the beamformer channels.

In one or more embodiments, the beamformer device may be configured to receive a selection command via the digital control interface and to couple either the serial data output or the power detector output to the beamformer monitor output dependent on the selection command. In one or more embodiments, the beamformer device may further comprise a multiplexer having a plurality of multiplexer inputs, and a multiplexer output, and a multiplexer control input, each multiplexer input being coupled to a respective power detector output of a beamformer channel and a select switch having a first switch terminal coupled to the multiplexer output, a second switch terminal coupled to the serial data output and a third switch terminal coupled to the beamformer monitor output.

In one or more embodiments, the beamformer device may further comprise control logic coupled to the digital control interface, the multiplexer control input, and the select switch and configured to control the multiplexer and the select switch to select the power detector output of one of the beamformer channels.

In one or more embodiments, each beamformer channel may further comprise: a transmitter amplifier having a transmitter amplifier input configured to be switchably coupled to the RF terminal, a transmitter amplifier output configured to be switchably coupled to the antenna connection terminal and wherein the power detector is arranged between the transmitter amplifier output and the antenna connection terminal; and a receiver amplifier having a receiver amplifier input configured to be switchably coupled to the antenna connection terminal and a receiver amplifier output configured to be switchably coupled to the RF terminal.

In one or more embodiments, the power detector may further comprise a coupler arranged between the transmitter amplifier output and a diode.

Embodiments of the beamformer device may be included in a multiple-input multiple-output (MIMO) antenna system for a mobile communications cellular network.

In one or more embodiments, the MIMO antenna system may further comprise: an array of patch antennas; a plurality of beamformer devices, each respective antenna connection terminal being coupled to a respective feedpoint of the array of patch antennas; an up-down converter (UDC); a combiner-splitter coupled to the UDC, the combiner-splitter being configured to split a signal provided by the UDC and provide the signal to each of the plurality of beamformer devices and/or to combine a signal provided by the plurality of beamformer devices and to provide the combined signal to the UDC; a replica detector having a plurality of inputs, each input coupled to a respective beamformer monitor output and a replica detector output; a controller having a first plurality of control outputs, each control output coupled to a respective control input of each beamformer device; a first control input coupled to a respective beamformer monitor output and a second control output coupled to the replica detector; wherein the controller is operable to output a control command to each beamformer device to selectively couple either the serial data output or the power detector output of one of the beamformer channels in each beamformer device.

In one or more embodiments, the controller may be further operable to: configure one or more of the beamformer channels in one or more of the beamformer devices to transmit an RF signal; transmit an RF signal via the UDC and combiner-splitter; detect a replica of the transmitted RF signal via the respective beamformer monitor output.

In one or more embodiments, the MIMO antenna system may further comprise a digital front end (DFE) coupled to the UDC, wherein the replica detector output is coupled to the DFE, and the DFE is configured to apply digital predistortion to a RF signal for transmission from a replica RF signal received on the replica detector input.

In one or more embodiments, the replica detector may comprise a series arrangement of a multiplexer and a mixer and wherein the replica detector is configured to receive an RF signal from a selected beamformer device, to downconvert the received RF signal and provide the downconverted RF signal to the replica detector output.

In one or more embodiments, the array of patch antennas may comprise dual polarization patch antennas.

In a second aspect there is provided a method of operating a beamformer device for a multiple-input, multiple output, (MIMO) antenna system, the beamformer device comprising: a plurality of beamformer channels, each beamformer channel comprising a RF terminal, an antenna connection terminal; and a power detector having a power detector output and; a digital control interface comprising a serial data input and a serial data output, the method comprising: selectively coupling either the serial data output or the power detector output of one of the beamformer channels to a beamformer monitor output of the beamformer device.

In one or more embodiments, the method may further comprise receiving a selection command via the digital control interface and to selecting either the serial data output or the power detector output determined from the selection command.

In one or more embodiments, the beamformer device may further comprise a multiplexer having a plurality of multiplexer inputs, and a multiplexer output, and a multiplexer control input, each multiplexer input being coupled to a respective power detector output of a beamformer channel and a select switch having a first switch terminal coupled to the multiplexer output, a second switch terminal coupled to the serial data output and a third switch terminal coupled to the beamformer monitor output, and wherein the method may further comprise selectively coupling either the serial data output or the power detector output of one of the beamformer channels to a beamformer monitor output of the beamformer device by controlling the multiplexer and the select switch.

In one or more embodiments, the method may further comprise in a MIMO antenna system comprising a plurality of the beamformer devices and a digital front end: selectively coupling one of the power detector outputs to the beamformer monitor output of at least one of the beamformer devices during a first time interval; and providing a replica RF signal from the selected power detector output to the digital front end; applying digital predistortion to a RF signal for transmission from a replica RF signal received on the replica detector input; and selectively coupling the serial data output to the beamformer monitor output of each of the beamformer devices during a second time interval.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
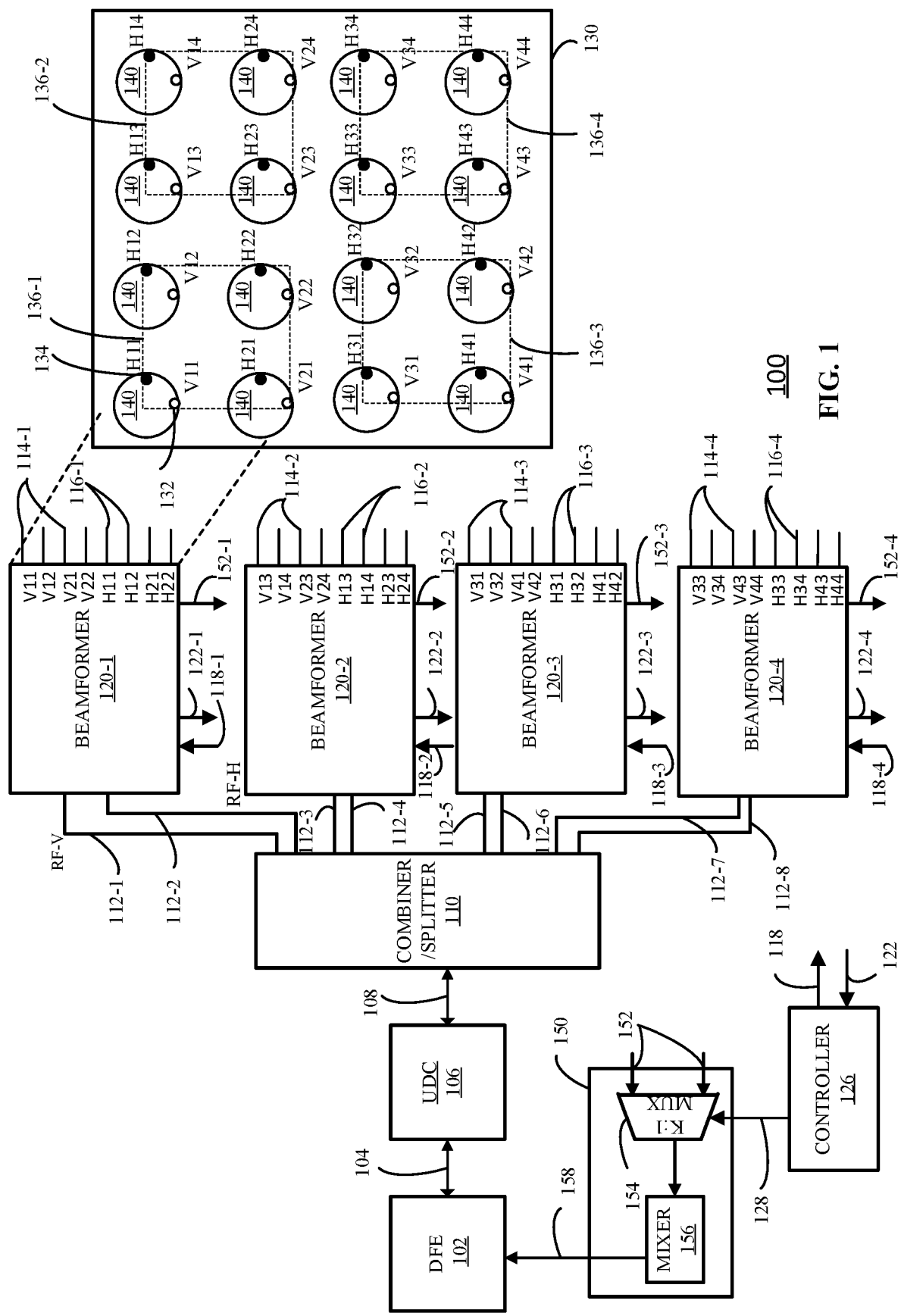
FIG. 1 shows an example MIMO antenna system with Digital Predistortion implemented signal replicas extracted by using couplers and detectors and multiplexed to the observation channel.

FIG. 1 shows an example MIMO antenna system for mobile communication. The MIMO antenna system 100 includes a digital front-end (DFE) 102 connected by connection 104 to an up/down converter (UDC) 106. The UDC 106 may be connected by connection 108 to a combiner-splitter 110 which may implemented as a Wilkinson network.

The connections 104 and 108 may be single connections or multiple connections, for example separate connections for in-phase (I) and quadrature (Q) IF passband signals. The connections 104, 108 may also have separate connections for RF-H and RF-V signals. In other examples, the RF-H and RF-V signals may be time-multiplexed. The MIMO antenna system 100 may further include a number of beamformers 120-1, 120-2, 120-3, 120-4. Each beamformer is connected by a pair of respective connections, one for RF-H and one for RF-V. For example beamformer 120-1 is connected by connections 112-1 and 112-2 to the combiner-splitter 110. Similarly connections 112-3 to 112-8 connect the combiner-splitter 110 to each respective beamformer 120-2, 120-3, 120-4. When providing a signal for beamforming, the combiner-splitter 110 may split a signal received from the UDC 106 into separate signals provided via connections 112 to beamformer channels (not shown) in each beamformer 120-1, 120-2, 120-3, 120-4. Alternatively, when receiving a signal from the beamformer, the combiner-splitter 110 may combine multiple signals received from connections 112 and provide the combined signal to the UDC 106.

The antenna panel 130 consists of an array of dual-polarization antenna patches 140. A 4×4 array of patch antennas is illustrated but other example may have more patch antennas. An antenna patch 140 includes a first polarization feed-point 132 and second polarization feed-point 134. As illustrated the first polarization feed-point 132 is a vertical polarization feed-point and the second polarization feed-point 134 is a horizontal polarization feed-point. The terms horizontal and vertical polarization as used herein may be considered to refer to two mutually orthogonal polarization directions. The horizontal and vertical feed-points are denoted by Hij and Vij where i is the row number and j is the column number of each patch antenna 140 in the antenna panel 130. The orientation of the antenna patches 140 may be different than illustrated. The phased-array antenna system 100 may be configured to transmit or receive a number of beams for example 4 or 8 beams. The number of beamformers 120 is dependent on how many antenna patches 140 are used for each beam.

As illustrated, beamformer 120-1 includes four vertical polarization beamformer channels (not shown) with connections 114-1 denoted V11,V12,V21,V22 to corresponding feed points 132 of a respective one of the patch antennas 140 in an antenna section 136-1. Beamformer 120-1 includes four horizontal polarization beamformer channels (not shown) having connections 116-1 denoted H11, H12, H21, H22 to corresponding feed points 134 of a respective one of the patch antennas 140 in antenna section 136-1. Similarly beamformers 120-2, 120-3, 120-4 have horizontal and vertical polarization beamformer channels (not shown) similarly connected via respective connections 114-2,114-3,114-4,116-2,116-3,116-4 to respective antenna sections 136-2, 136-3 and 136-4. As illustrated, four beamformers are required so one beamformer is connected to each of antenna-sections 136. In other examples, each beamformer may have fewer or more channels. Each beamformer 120-1 to 120-4 has a respective RF detection output 152-1 to 152-4 which can be selectively coupled to a power detector output (not shown) of one of the horizontal or vertical polarization beamformer channels.

MIMO antenna system 100 has a replica detector 150 to provide an RF observation channel which may provide one RF observation during one time interval. The replica detector 150 as illustrated includes a series arrangement of a multiplexer 154 and mixer 156. The multiplexer 154 may have a multiplexer control input connected to control line 128 from a controller 126. The RF detection outputs 152-1 to 152-4 are connected to a respective input of the multiplexer 154. The replica detector has a replica detector output 158 which may be connected to the DFE 102. The controller 126 may have control outputs which connect to control inputs 118-1 to 118-4 of the respective beamformers 120-1 to 120-4 and control inputs connected to control outputs 122-1 to 122-4 of the respective beamformers 120-1 to 120-4. The control inputs and control outputs typically implement a serial peripheral interface (SPI) bus and may be used to set control parameters and receive status information for each beamformer 120. In other examples, the multiplexer 154 may be replaced with a resistive T-network which combines all the power detector outputs to a single node. The selection of the required power detector may be done by enabling only one of the RF detection outputs 152-1 to 152-4 of the beamformers 120-1 to 120-4.

In operation the antenna system 100 may be configured to transmit a beamformed signal or to beamform a received signal. The beamformers 120 may be configured in a transmit or receive mode. In a transmit mode of operation a digital signal may be converted to an analog IF signal by DFE 102. The analog signals are up-converted by UDC 106 and then split to provide the vertical polarization RF signal RF-V and the horizontal polarization RF signal RF-H for each beamformer 120. The RF-V and RF-H signals may then be output from the beamformer 120-1 as four vertical polarization RF signals connected to four polarization feed-points V11, V12, V21, V22 and four horizontal polarization RF signals connected to four polarization feed-points H11, H12, H21, H22. The beam-formed signal is transmitted from antenna section 136-1. Similarly, the other beamformer devices output signals to corresponding antenna sections 136-2, 136-3, 136-4 respectively. Four antenna sections are illustrated, but it will be appreciated that in general there may be an antenna section corresponding to each beamformer. The resulting beam is transmitted from the antenna sections 136-1, 136-2, 136-3, 136-4.

During transmission, the detection output may be selected by the controller 126 from one of the respective beamformers 120-1 to 120-4. A replica of the transmitted RF signal may be detected by a power detector which may be include a coupler at the output of a transmitter power amplifier (not shown) in a beamformer channel signal. The replica RF signal may be down converted by mixer 156 and provided to the digital front end 102. The DFE 102 may process the received RF replica signal and apply digital predistortion to a signal for transmission to improve the linearity of the MIMO antenna system 100.

In a receive mode of operation, the beamformers 120-1, 120-2, 120-3, 120-4 may be configured to receive RF signals from the respective antenna section 136-1, 136-2, 136-3, 136-4 to preferentially receive a signal from a particular direction. The detected signals are then received via the beamformers and combined by the combiner-splitter 110. The UDC 106 down-converts the RF signal to an IF signal. The resulting IF signals are converted to digital signals by DFE 102. In some examples the replica detector 150 and the controller 126 may be included in the DFE 102.

The MIMO antenna system 100 may operate in a time division duplex (TDD) mode of operation. During each time-slot, the phased-array antenna system 100 is configured to select to transmit and/or receive a number of beams. A beamformed signal is transmitted or a received signal is beamformed in a particular time slot.

Figure 2:
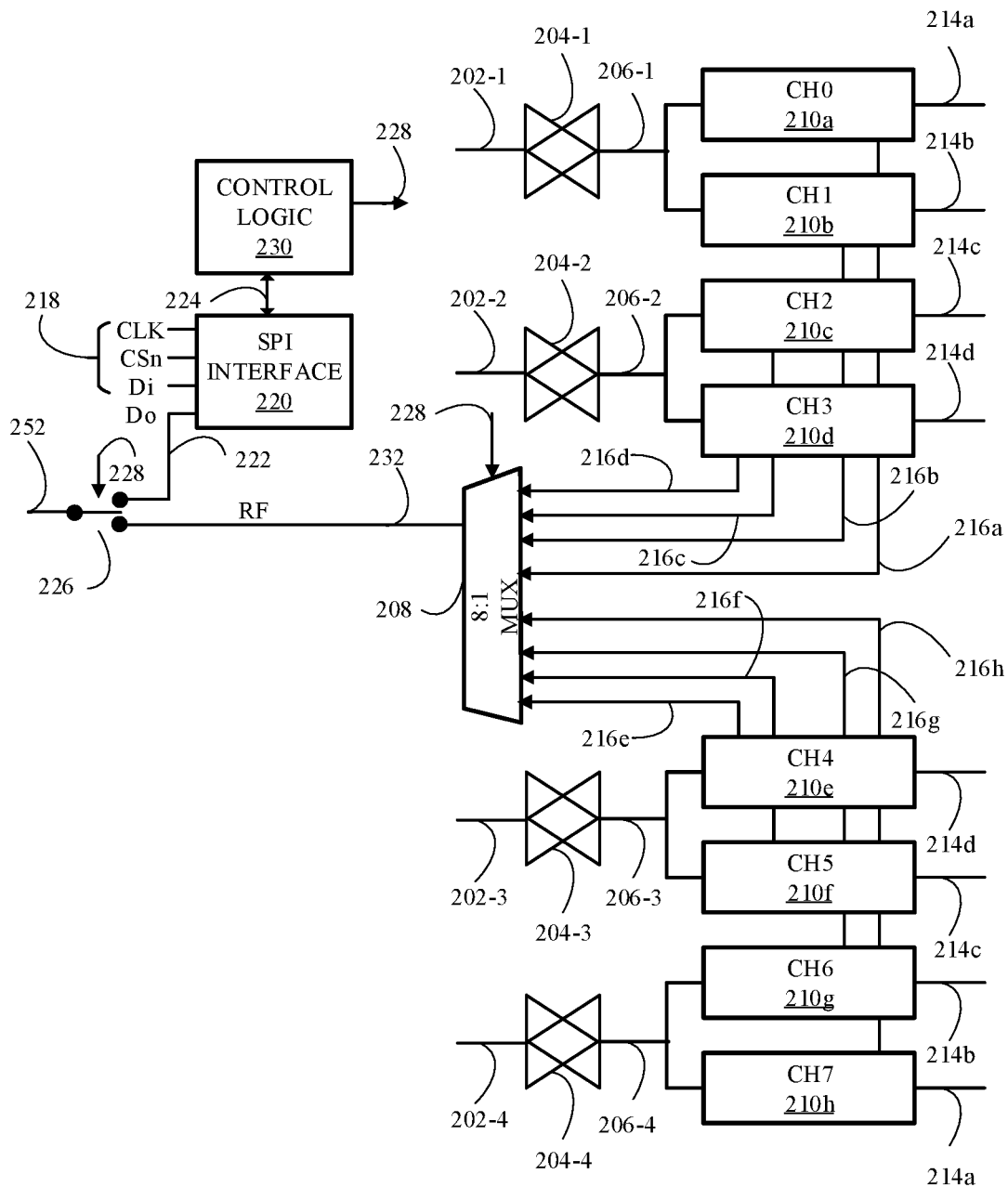
FIG. 2 shows a beamformer device according to an embodiment.

FIG. 2 shows a beamformer device 200 according to an embodiment. In this example eight channels 210a-h are shown but in other examples there may be fewer or more channels. Each of the channels 210a-d has a corresponding channel detector output 216a-h connected to a 8-to-1 multiplexer 208. The multiplexer output of the multiplexer 208 is connected to a beamformer detector output 232. Each of the multiplexer inputs of multiplexer 208 may be connected to a respective power detector output 216a-h. Each of the channels 210a-d has a corresponding antenna connection terminal 214a-h. The RF terminals 202-1 to 202-4 may be connected to bidirectional buffers 204-1 to 204-4. A first bidirectional buffer 204-1 may have a connection 206-1 to a first beamformer channel 210a and a second beamformer channel 210b. A second bidirectional buffer 204-2 may have a connection 206-2 to the third beamformer channel 210c and the fourth beamformer channel 210b. A third bidirectional buffer 204-3 may have a connection 206-3 to a fifth beamformer channel 210e and a sixth beamformer channel 210f. A fourth bidirectional buffer 204-4 may have a connection 206-4 to the seventh beamformer channel 210g and the eighth beamformer channel 210h.

Beamformer device 200 includes an SPI interface 220 connected by connection 224 to control logic 230. The SPI interface may have a number of inputs 218 consisting of serial data input Di, clock input CLK and enable input CSn which may be an active low chip select. The SPI interface may have a serial data output 222 which may be connected to a first terminal of select switch 226. The beamformer detector output 232 may be connected a second terminal of the select switch 226. A third terminal of select switch 226 may be connected to a beamformer monitor output 252. The control logic 230 may have one or more control outputs 228 connected to a control input of the multiplexer 208 and a control input of the select switch 226.

During operation in a transmit mode, the signal received from the radio chain is provided to each of the beamformer channels 210a-h and output on the respective antenna connection terminals 214*a-h*. Detection signals are provided by channel detector outputs 216*a-h* to multiplexer 208. The multiplexer 208 can be controlled by control logic 230 to select which signal is output to the select switch 226. The select switch 226 may be controlled by control logic 230 to couple the beamformer monitor output 252 to either the serial data output Do or a replica of a transmitted RF signal which may be referred to as a replica RF signal from detection output 232 of the multiplexer 208. In some examples, the select switch 226 may be implemented using transistors for example NMOS transistors or other circuitry that implements an analog multiplexer or select switch function. The select switch may be controlled to select the serial data output during a first time interval and the replica Rf signal during a second time interval. The second time interval may be at least partly a time period during a guard band interval during transmission. Because the characteristic of a transmitted signal vary relatively slowly, the replica signal may only need to be sampled relatively infrequently.

Figure 3:
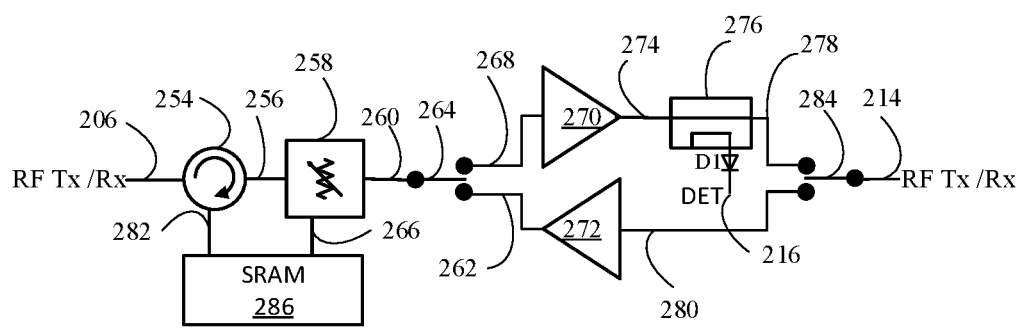
FIG. 3 shows an example implementation of a channel in the beamformer of FIG. 2.

FIG. 3 shows an example implementation of a beamformer channel 210. Bidirectional RF connection 206 is connected to phase shifter 254. The phase shifter 254 is connected via connection 256 to an attenuator 258. Phase shifter 254 has a control input 282 connected to SRAM 286. Attenuator 258 has a control input 266 connected to SRAM 286. SRAM 286 is used to store gain and shift parameter values (bits) which may be received from the SPI interface 220 via the control logic 230.

A first select switch 264 has a first terminal 260 connected to the attenuator 258, a second terminal 268 connected to an input of a transmitter amplifier 270 and a third terminal 262 connected to the output of a receiver amplifier 272. The transmitter amplifier output 274 is connected to a power detector 276 which typically includes a coupler and diode D1. The detector output 216 is connected to the anode of the diode D1. The main signal is routed through the power detector 276 to a first terminal 278 of a second select switch 284. A second terminal 280 of the second select switch 284 is connected to an input of the receiver amplifier 270. A third terminal of the second select switch 284 is connected to the antenna connection 214. First and second select switches 264,284 are controlled by the control logic 230 to configure the beamformer channel to either transmit an RF signal received at RF connection 206 to the antenna via antenna connection 214 or to receive a signal via antenna connection 214 and transmit the received signal via RF connection 206. First and second select switches 264,284 may for example be implemented using NMOS transistors and may also be considered as multiplexers.

In operation in a transmit mode, the first select switch 264 and second select switch 284 are controlled by the control logic 230 to connect the attenuator 258 to the input of the transmitter amplifier 270 and to connect the transmitter amplifier output 274 to the antenna connection 214 via power detector 276. In a receive mode, the first select switch 264 and second select switch 284 are controlled by the control logic 230 to connect the attenuator 258 to the output of the receiver amplifier 272 and the antenna connection 214 to the input of the receiver amplifier 272.

Figure 4:
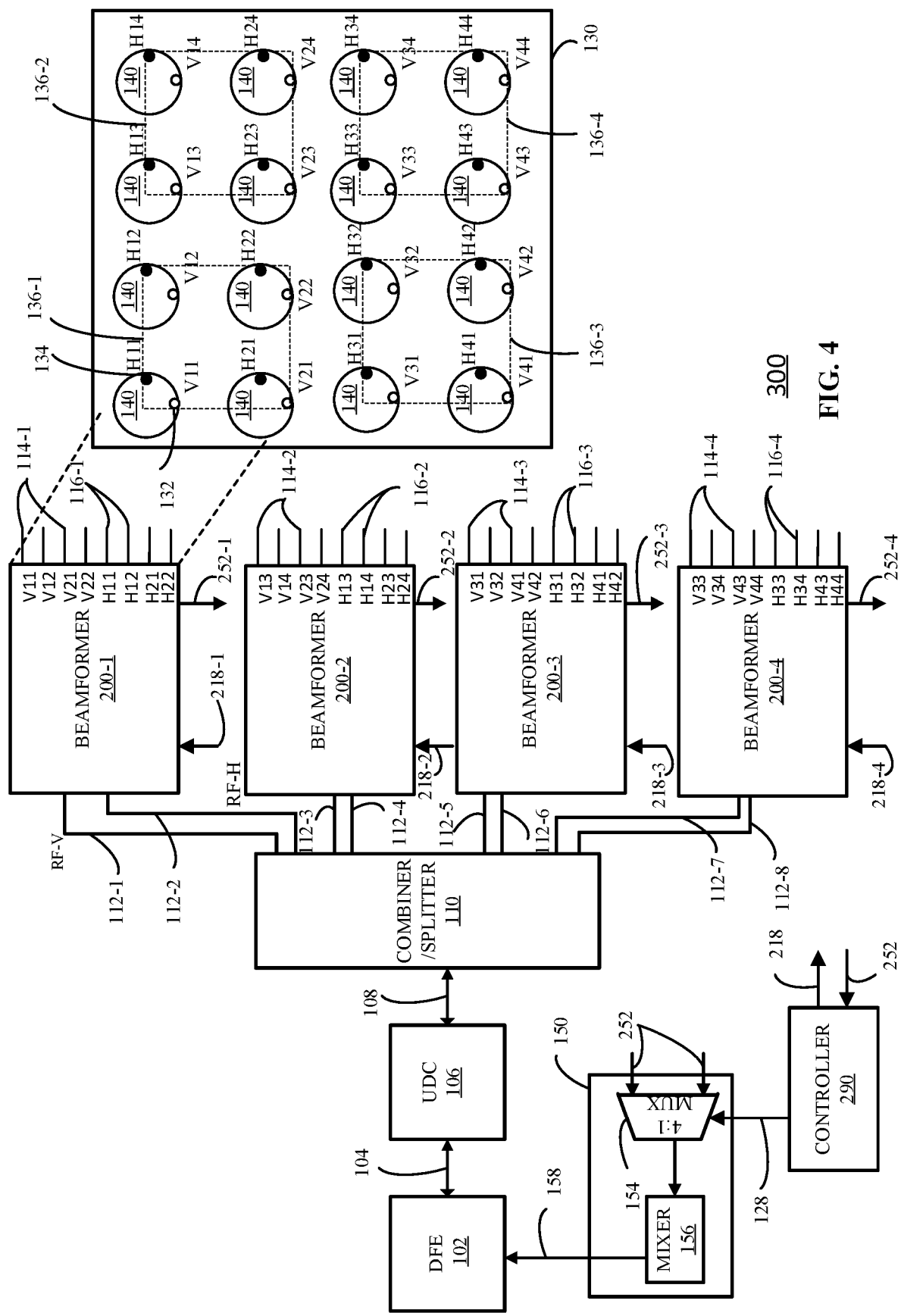
FIG. 4 illustrates a MIMO antenna system with the beamformer device of FIG. 3 according to an embodiment.

The beamformer device 200 allows a MIMO system to be implemented with reduced routing complexity by sharing the digital output of the control interface with the analog RF detector output from the selected power detector 276 which may be used to provide a replica of a transmitted RF signal to a digital front end of a MIMO antenna system to apply digital predistortion to a RF signal. FIG. 4 illustrates a MIMO antenna system 300 including four beamformer devices 200, denoted as 200-1 to 200-4 according to an embodiment. The MIMO antenna system 300 is similar to MIMO antenna system 100 with beamformer devices 200 replacing beamformer device 120 and controller 290 replacing controller 126. The connections 252-1 to 252-4 are time multiplexed to provide the serial digital data out signal (Do) to the controller 290 and the analogue power detection output used for predistortion which is provided to the replica detector 150. The controller 290 may transmit one or more control commands which may also be referred to as selection commands to control the multiplexing of the Do and power detection signals via the control inputs 218.

In other examples the beamformer device may use alternative serial interfaces than SPI for communication. In some examples, the controller may select an analogue power detection output only during a guard band interval of an OFDM symbol and select the digital data output otherwise. Because the characteristics of the transmitted signal are expected to change relatively slowly with time, the power detection output may not need to be monitored as frequently as the data output. In other examples, the multiplexer 154 may be replaced with a resistive T-network which combines all the power detector outputs to a single node. The selection of the required power detector may be done by enabling only one of the outputs 252-1 to 252-4 of the beamformers 200-1 to 200-4 when the replica detection signal is selected by selection switch 226.

Figure 5:
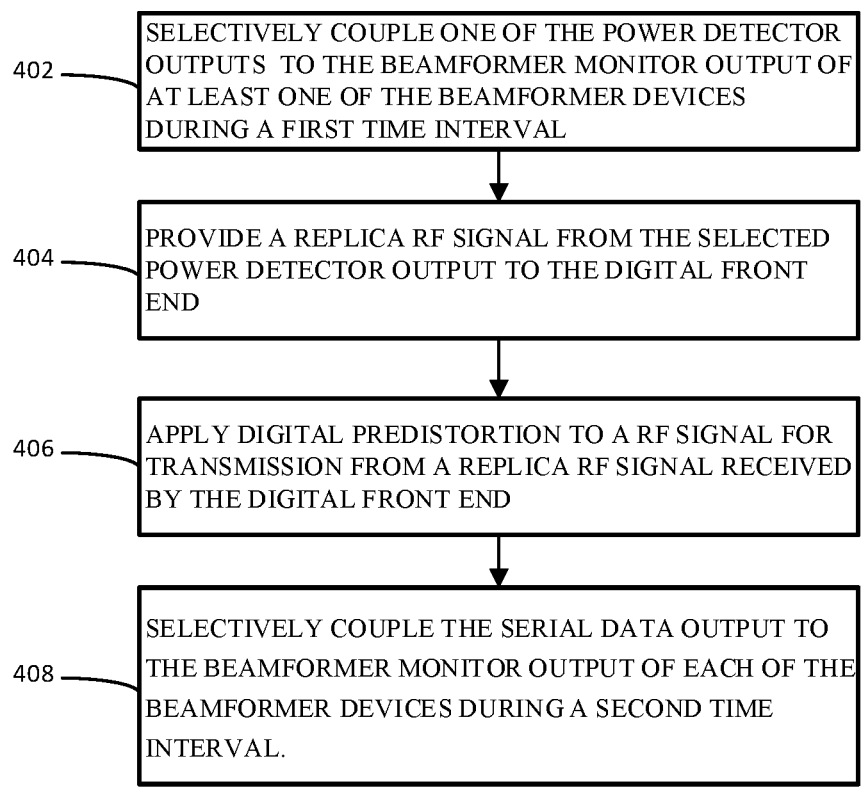
FIG. 5 shows a method of operating a MIMO antenna system including a number of beamformer devices according to an embodiment.

FIG. 5 shows a method 400 of operating a MIMO antenna system including a number of beamformer devices, for example MIMO antenna system 300. In step 402, one of the power detector outputs may be selectively coupled to the beamformer monitor output 252-1 to 252-4 of at least one of the beamformer devices 200-1 to 200-4 during a first time interval. In step 404 a replica RF signal from the selected power detector output may be provided to the digital front end 102 for example via replica detector circuit 150. In step 406, digital predistortion to a RF signal for transmission may be applied based on the replica RF signal received by the digital front end 102. In step 408, during a second time interval, the serial data output of a serial data interface in a beamformer device may be coupled to the beamformer monitor output of each of the beamformer devices. The serial data interface may be used by a controller, for example controller 290 to control beamformer devices 200-1 to 200-4.

A beamformer device for a multiple-input, multiple-output (MIMO) antenna system and method of operating a beamformer device is described. The beamformer device includes a number of beamformer channels. Each beamformer channel includes a RF terminal, an antenna connection terminal; and a power detector having a power detector output. The beamformer device includes a digital control interface comprising a serial data input and a serial data output; a control input coupled to the serial data input; and a beamformer monitor output configured to be selectively coupled to either the serial data output or the power detector output of one of the beamformer channels.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A beamformer device for a multiple-input, multiple-output (MIMO) antenna system, the beamformer device comprising:
   a beamformer channel including a transmitter amplifier, a radio frequency (RF) terminal, and an antenna connection terminal, wherein the transmitter amplifier is configured to receive an input RF signal from the RF terminal, and to produce a transmitted RF signal at the antenna connection terminal;
   a power detector having a power detector output, wherein the power detector is configured to produce a replica of the transmitted RF signal at the power detector output;
   a digital control interface including a serial data input and a serial data output, wherein the digital control interface is configured to produce a digital output at the serial data output; and
   a selection circuit having a first terminal coupled to the power detector output, a second terminal coupled to the serial data output, and a third terminal coupled to a beamformer monitor output, wherein the selection circuit is configured to either couple the serial data output or the power detector output at any given time to the beamformer monitor output.

2. The beamformer device of claim 1, wherein the beamformer device is configured to receive a selection command via the digital control interface and to couple either the serial data output or the power detector output to the beamformer monitor output dependent on the selection command.

3. The beamformer device of claim 1 further comprising:
   a plurality of beamformer channels, including the beamformer channel;
   a plurality of power detectors with a plurality of power detector outputs, including the power detector and the power detector output; and
   a multiplexer having a plurality of multiplexer inputs, a multiplexer output, and a multiplexer control input, wherein the plurality of multiplexer inputs is coupled to the plurality of power detector outputs.

4. The beamformer device of claim 3 further comprising: control logic coupled to the digital control interface, the multiplexer control input, and the selection circuit and configured to control the multiplexer to select one of the multiple power detector outputs to provide at the multiplexer output, and to control the selection circuit to couple the multiplexer output to the beamformer monitor output.

5. The beamformer device of claim 1, wherein;
   the transmitter amplifier has a transmitter amplifier input configured to be switchably coupled to the RF terminal, and a transmitter amplifier output configured to be switchably coupled to the antenna connection terminal;
   the power detector is arranged between the transmitter amplifier output and the antenna connection terminal; and
   each beamformer channel further includes a receiver amplifier having a receiver amplifier input configured to be switchably coupled to the antenna connection terminal and a receiver amplifier output configured to be switchably coupled to the RF terminal.

6. The beamformer device of claim 5, wherein the power detector further comprises a coupler arranged between the transmitter amplifier output and a diode.

7. The beamformer device of claim 1, wherein the selection circuit comprises a switch.

8. A multiple-input multiple-output (MIMO) antenna system for a mobile communications cellular network, the antenna system comprising:
   a plurality of beamformer devices, wherein each beamformer device includes
      a beamformer channel including a transmitter amplifier, a radio frequency (RF) terminal, and an antenna connection terminal, wherein the transmitter amplifier is configured to receive an input RF signal from the RF terminal, and to produce a transmitted RF signal at the antenna connection terminal, a power detector having a power detector output, wherein the power detector is configured to produce a replica of the transmitted RF signal at the power detector output, a digital control interface including a serial data input and a serial data output, wherein the digital control interface is configured to produce a digital output at the serial data output, and a selection circuit having a first terminal coupled to the power detector output, a second terminal coupled to the serial data output, and a third terminal coupled to a beamformer monitor output, wherein the selection circuit is configured to either couple the serial data output or the power detector output at any given time to the beamformer monitor output.

9. The MIMO antenna system of claim 8 further comprising:

an array of patch antennas, wherein each respective antenna connection terminal of a beamformer device of the plurality of beamformer devices is coupled to a respective feedpoint of the array of patch antennas;

an up-down converter (UDC);

a combiner-splitter coupled to the UDC, the combiner-splitter being configured to split a signal provided by the UDC and provide the signal to each of the plurality of beamformer devices, and to combine a plurality of signals provided by the plurality of beamformer devices and to provide a combined signal to the UDC;

a replica detector having a plurality of first inputs, a second input, and a replica detector output, wherein each first input is coupled to a respective beamformer monitor output; and a controller having a plurality of first control outputs, a second control output, and a first control input, wherein each first control output is coupled to a respective control input of each beamformer device of the plurality of beamformer devices, the first control input is coupled to a respective beamformer monitor output, and the second control output is coupled to the replica detector, wherein the controller is operable to output a control command to each beamformer device to selectively couple either the serial data output or the power detector output of one of the beamformer channels in each beamformer device.

10. The MIMO antenna system of claim 9, wherein the controller is further operable to:

configure one or more of the beamformer channels in one or more of the beamformer devices to transmit an RF signal;

transmit an RF signal via the UDC and combiner-splitter; and detect the replica of the transmitted RF signal via the respective beamformer monitor output.

11. The MIMO antenna system of claim 9 further comprising:

a digital front end (DFE) coupled to the UDC, wherein the replica detector output is coupled to the DFE, and the DFE is configured to apply digital predistortion to a RF signal for transmission from a replica RF signal received on the replica detector input.

12. The MIMO antenna system of claim 9 wherein the replica detector comprises:

a series arrangement of a multiplexer and a mixer, and wherein the replica detector is configured to receive an RF signal from a selected beamformer device, to down-convert the received RF signal and provide the down-converted RF signal to the replica detector output.

13. The MIMO antenna system of claim 9 wherein the array of patch antennas comprise dual polarization patch antennas.

14. The MIMO antenna system of claim 8, wherein the selection circuit comprises a switch.

15. A method of operating a beamformer device for a multiple-input, multiple output (MIMO) antenna system, the method comprising:

selectively coupling either a serial data output of a digital control interface or a power detector output of a beamformer channel of the beamformer device to a beamformer monitor output of the beamformer device, wherein the beamformer channel includes a transmitter amplifier, an RF terminal, and an antenna connection terminal, and a power detector having the power detector output, the transmitter amplifier is configured to receive an input RF signal from the RF terminal, and to produce a transmitted RF signal at the antenna connection terminal, the power detector is configured to produce a replica of the transmitted RF signal at the power detector output, the digital control interface includes a serial data input and the serial data output, and the digital control interface is configured to produce a digital output at the serial data output.

16. The method of claim 15, further comprising receiving a selection command via the digital control interface and selecting either the serial data output or the power detector output determined from the selection command.

17. The method of claim 15, wherein:

the beamformer device further includes
a plurality of beamformer channels, including the beamformer channel,
a plurality of power detectors with a plurality of power detector outputs, including the power detector and the power detector output, and
a multiplexer having a plurality of multiplexer inputs, a multiplexer output, and a multiplexer control input, each multiplexer input being coupled to a respective power detector output of a beamformer channel;

the MIMO antenna system further includes a select switch having a first switch terminal coupled to the multiplexer output, a second switch terminal coupled to the serial data output, and a third switch terminal coupled to the beamformer monitor output; and the method further comprises selectively coupling either the serial data output or the power detector output of one of the beamformer channels to the beamformer monitor output of the beamformer device by controlling the multiplexer and the select switch.

18. A method of operating a multiple-input multiple-output (MIMO) antenna system for a mobile communications cellular network, wherein the MIMO antenna system includes a plurality of beamformer devices and a digital front end, and wherein:

each beamformer device of the plurality of beamformer devices includes
a beamformer channel including a transmitter amplifier, a radio frequency (RF) terminal, and an antenna connection terminal, wherein the transmitter amplifier is configured to receive an input RF signal from the RF terminal, and to produce a transmitted RF signal at the antenna connection terminal, a power detector having a power detector output, wherein the power detector is configured to produce a replica of the transmitted RF signal at the power detector output, a digital control interface including a serial data input and a serial data output, wherein the digital control interface is configured to produce a digital output at the serial data output, and a selection circuit having a first terminal coupled to the power detector output, a second terminal coupled to the serial data output, and a third terminal coupled to a beamformer monitor output, wherein the selection circuit is configured to either couple the serial data output or the power detector output at any given time to the beamformer monitor output, and the method comprises selectively coupling the power detector output of one of the beamformer devices to the beamformer monitor output of at least one of the plurality of beamformer devices during a first time interval;

providing a replica RF signal from the selected power detector output to the digital front end;

applying digital predistortion to an RF signal for transmission from a replica RF signal received by the digital front end; and selectively coupling the serial data output to the beamformer monitor output of each of the beamformer devices during a second time interval.

* * * * *